(12) United States Patent
Vinhas et al.

(10) Patent No.: US 9,649,699 B2
(45) Date of Patent: May 16, 2017

(54) METHOD FOR DRILLING A STACK OF MATERIALS, DRILL BIT AND DRILLING DEVICE

(71) Applicant: AIRBUS GROUP SAS, Blagnac (FR)

(72) Inventors: Fernand Vinhas, Saint Germain en Laye (FR); Daniel Aliaga, Aubervilliers (FR); Guillaume Abrivard, Amiens (FR); Dominique Schuster, Saint Germain en Laye (FR)

(73) Assignee: AIRBUS GROUP SAS, Blagnac (FR)

( * ) Notice: Subject to any disclaimer, the term of this patent is extended or adjusted under 35 U.S.C. 154(b) by 0 days.

(21) Appl. No.: 14/716,868

(22) Filed: May 19, 2015

(65) Prior Publication Data

US 2016/0136736 A1    May 19, 2016

(30) Foreign Application Priority Data

May 7, 2014    (EP) .................................... 14305671

(51) Int. Cl.
| | |
|---|---|
| *B23B 1/00* | (2006.01) |
| *B23B 41/00* | (2006.01) |
| *B23B 35/00* | (2006.01) |
| *B23B 51/00* | (2006.01) |

(52) U.S. Cl.
CPC ............. *B23B 41/00* (2013.01); *B23B 35/00* (2013.01); *B23B 51/00* (2013.01); *B23B 2222/28* (2013.01); *B23B 2222/88* (2013.01); *B23B 2226/275* (2013.01); *B23B 2226/31* (2013.01); *B23B 2228/36* (2013.01);

(Continued)

(58) Field of Classification Search
CPC ..... B23B 2265/12; B23B 41/00; B23B 35/00; B23B 51/00; B23B 2222/28

See application file for complete search history.

(56) References Cited

U.S. PATENT DOCUMENTS

| | | | |
|---|---|---|---|
| 1,407,546 A | | 2/1922 | Joseph |
| 3,477,340 A | * | 11/1969 | Faugli Per Ragnar ... B23C 5/00 407/45 |
| 4,190,386 A | | 2/1980 | Brabetz et al. |

(Continued)

FOREIGN PATENT DOCUMENTS

| | | |
|---|---|---|
| EP | 1 992 437 A1 | 11/2008 |
| EP | 2 529 867 A1 | 12/2012 |

(Continued)

*Primary Examiner* — Daniel Howell
*Assistant Examiner* — Alan Snyder
(74) *Attorney, Agent, or Firm* — Im IP Law; C. Andrew Im

(57) ABSTRACT

A method for drilling through an assembly forming a stack of at least two different materials uses a drill bit having at least a first cutting edge and a second cutting edge inclined in an axial plane of the drill bit so that the end of the drill bit has a projecting conical shape. The first cutting edge is configured to drill a first material. The second cutting edge is made differently from the first cutting edge, to drill a second material. A first rotational drive axis of the drill bit is laterally offset during the drilling by an offset distance D relative to the axis of the drill bit in a direction opposite the first cutting edge when the drill bit is drilling through the first material, and alternately, in a direction opposite the second cutting edge when the drill bit is drilling through the second material.

24 Claims, 4 Drawing Sheets

(52) U.S. Cl.
  CPC ..... *B23B 2251/14* (2013.01); *B23B 2251/202* (2013.01); *B23B 2251/204* (2013.01); *B23B 2265/12* (2013.01)

(56) References Cited

U.S. PATENT DOCUMENTS

| | | | | |
|---|---|---|---|---|
| 4,231,692 | A | * 11/1980 | Brabetz et al. | ......... B23B 51/02 408/230 |
| 5,038,642 | A | 8/1991 | Alverio et al. | |
| 5,685,674 | A | * 11/1997 | Tåquist et al. | .......... B23B 51/02 408/1 R |
| 8,534,967 | B2 | * 9/2013 | Miyamoto et al. | B23Q 11/0046 408/11 |

FOREIGN PATENT DOCUMENTS

| | | |
|---|---|---|
| FR | 2 403 712 A1 | 4/1979 |
| WO | 01/23127 A1 | 4/2001 |

* cited by examiner ively incompatible drilling requirements due to their intrinsic characteristics, for example in the case

METHOD FOR DRILLING A STACK OF MATERIALS, DRILL BIT AND DRILLING DEVICE

RELATED APPLICATIONS

This application claims priority from European Patent Application No. 14305671.1 filed May 7, 2014, which is herein incorporated by reference in its entirety.

TECHNICAL FIELD OF THE INVENTION

The invention belongs to the field of materials used to produce assemblies and in particular the drilling of such materials.

More particularly, the invention relates to a method, a drill bit and a drilling device for drilling through a stack of materials with different characteristics.

BACKGROUND OF THE INVENTION

In the field of structures or in the field of mechanics in general, it is known to assemble several pieces by means of fasteners, rivets or bolts for example, passing through a pre-formed hole and running through the pieces to be assembled.

In many cases it is necessary to obtain a perfect alignment of the hole running through the various pieces and to produce the hole in the various pieces while they are in the relative positions they must occupy during assembly.

When the various pieces are composed of materials that are similar in nature, a metal alloy such as steel or an aluminum alloy for example, the drilling does not present any particular problem in terms of the cutting tool chosen to produce the hole, since the person skilled in the art will be familiar with the drilling of a homogenous material.

When the pieces form a stack of different materials, it is usually not possible to easily produce a quality hole with the same tool and/or with the same cutting parameters.

In that case, which occurs for example when drilling through a stack composed of a metal piece and a piece made of composite material, it is known to use a tool considered to be compatible with both materials and to vary the cutting parameters, rotation speed and advance of the drill bit based on the material being drilled.

This solution, however, has the disadvantage of not being possible for all of the pairs of materials encountered in the industry, and when it is possible to use a tool compatible with both materials, the choice is often the result of a compromise on the drilling conditions and quickly leads to damage to the tools, due to the conditions under which they are used. This results in drill holes whose quality, particularly the surface condition of the hole, is lower than that obtained when drilling with optimized tools.

It is also known to drill through each layer with a suitable drill bit, which requires drilling the hole in several stages, changing the drilling tool each time the material being passed through changes.

This solution leads to increased production times, and stopping and restarting the drilling after each tool change can lead to defects in alignment as well as defects in the surface condition of the hole.

These known solutions are even more difficult to implement when the different materials passed through are materials that have relatively incompatible drilling requirements due to their intrinsic characteristics, for example in the case of a stack comprising a piece made from a titanium alloy and a piece made from a carbon fiber composite material.

OBJECT AND SUMMARY OF THE INVENTION

This invention provides solutions for the known device and method by making it possible to produce a hole in a stack of different materials using a single means in a single drilling operation.

According to the invention, the drilling device comprises means for driving a chuck in rotation around a first axis, to which chuck is mounted a drill bit.

The drill bit has an axis and comprises at least a first cutting edge and a second cutting edge inclined in an axial plane of the drill bit so as to give the end of the drill bit a projecting conical shape.

Moreover:

the first cutting edge is made for drilling a first material;
the second cutting edge is made differently from the first cutting edge, for drilling the second material;
the chuck maintains the axis of the drill bit on a second axis of the chuck parallel to the first axis at an offset distance D from said first axis, said drill bit being mounted to said chuck so as to be driven in rotation at the rotation speed of said chuck;
the chuck and the drill bit have at least two distinct positions of the first axis relative to the axis of the drill bit for laterally offsetting the first axis relative to the axis of the drill bit in a direction opposite the first cutting edge in a first position and for laterally offsetting the first axis relative to the axis of the drill bit in a direction opposite the second cutting edge in a second position.

The drilling device thus makes it possible, when drilling through a stack of materials with different machining characteristics, to make two cutting edges of the same drill bit, having different machining characteristics, work independently and alternately so as to optimize the drilling conditions in each of the drilled materials, to avoid quickly damaging the tool, and to improve the quality of the hole produced.

In an advantageous embodiment of the drilling device, the first cutting edge and the second cutting edge are inclined in an axial plane of the drill bit so that they each form, with the axis of the drill bit, an angle between about 60 degrees and 45 degrees.

The projecting conical shape obtained makes it possible, with a slight lateral offset, to maintain a satisfactory advance of the drill bit during the drilling by creating the condition in which only one desired cutting edge removes matter at a given time during the drilling.

In an advantageous embodiment of the drilling device, each of the at least two distinct positions of the first axis relative to the axis of the drill bit corresponds to an offset from the first axis between 0.05 mm and 0.2 mm.

This axis offset, while being compatible with a realistic advance of the drilling, makes it possible to limit the problem of a cutting edge unsuited to the material being drilled to the tip of the tool in the center area.

In one embodiment of the drilling device, the first cutting edge is suitable for the drilling of hard metals.

The first cutting edge is formed, in one embodiment, of a tungsten carbide suitable for the drilling of titanium-based alloys.

In one embodiment of the drilling device, the second cutting edge is suitable for the drilling of abrasive materials.

The second cutting edge is formed, in one embodiment, of a diamond-comprising tungsten carbide, or formed by a diamond tip attached to the tool, suitable for the drilling of carbon fiber composite materials.

Thus, the drilling device obtained is capable of drilling through a stack of materials which ordinarily require individual drill bits with different characteristics, unless the drilling is performed with cutting edges of the tool that are optimized for each of the materials successively passed through during the drilling.

In one embodiment of the drilling device, the drill bit comprises three or four cutting edges, and the chuck and the drill bit have distinct positions of the first axis relative to the axis of the drill bit for laterally offsetting the first axis relative to the axis of the drill bit in each of the directions opposite the directions of each of the cutting edges.

This makes it possible, during the same drilling operation, to make three or four different cutting edges work independently and successively so as to drill a hole through a stack of material that may contain up to three or four different materials for which the desirable cutting edge characteristics are different.

In one embodiment of the drilling device, the chuck comprises a rotating sleeve with an off-center hole, movable in rotation on the chuck around the first axis, inside which sleeve the drill bit is maintained with the axis of the drill bit on a second axis of the rotating sleeve, the second axis being offset relative to the first axis so that a controlled rotation of the sleeve turning inside a barrel of the chuck changes the direction, in a reference frame linked to the drill bit, in which the first axis is offset relative to the axis of the drill bit.

Thus, a modification of the desired offset is easily obtained, the rotation of the sleeve in one embodiment being able to result from a reversal of the rotational direction of the drilling or from the action of elastic means sensitive to the torque exerted on the drill bit during machining.

The invention also relates to a drill bit adapted to the drilling device.

The drill bit comprises at least two cutting edges, said at least two cutting edges forming a projecting conical end of said drill bit in rotation around an axis of the drill bit. In the drill bit, a first cutting edge is made for removing matter from a first material during drilling and a second cutting edge is made, differently from the first cutting edge, for removing matter from a second material, different from the first material, during drilling.

In one embodiment of the drill bit, the first cutting edge and the second cutting edge are inclined in an axial plane of the drill bit so that they each form, with the axis of the drill bit, an angle between about 60 degrees and 45 degrees.

In one embodiment of the drill bit, the first cutting edge is suitable for the drilling of hard metals; for example, the first cutting edge is formed of a tungsten carbide suitable for the drilling of titanium-based alloys.

In one embodiment of the drill bit, the second cutting edge is suitable for the drilling of abrasive materials; for example, the second cutting edge is formed of a diamond-comprising tungsten carbide, or formed by a diamond tip attached to the tool, suitable for the drilling of carbon fiber composite materials.

The drill bit can also comprise, in one embodiment, three or four cutting edges, each cutting edge being made differently from the other cutting edges so as to remove matter from a different material during drilling.

In one embodiment of the drill bit, at least two cutting edges are disposed on said drill bit so as to remove matter during drilling in opposite directions of rotation of said drill bit around the axis of the drill bit.

In one embodiment of the drill bit, the drill bit comprises one or more straight grooves oriented along the axis of the drill bit.

Thus, according to these various characteristics, a drill bit adapted to the drilling device of the invention is obtained, providing the latter with the various advantages mentioned.

The invention also relates to a method for drilling through an assembly of pieces forming a stack of at least two materials having physical characteristics requiring different drilling conditions.

The method uses a drill bit with an axis, said drill bit comprising at least a first cutting edge and a second cutting edge inclined in an axial plane of the drill bit so as to give the end of the drill bit in rotation around its axis a projecting conical shape.

According to the method:
the first cutting edge is made for drilling a first material;
the second cutting edge is made differently from the first cutting edge, for drilling a second material;
and:
a first rotational drive axis of the drill bit during the drilling is placed and maintained laterally offset by an offset distance D relative to the axis of the drill bit;
the first axis is offset by the offset distance D relative to the axis of the drill bit in a direction opposite the first cutting edge when the drill bit is drilling through the first material, and alternately,
the first axis is offset by the offset distance D relative to the axis of the drill bit in a direction opposite the second cutting edge when the drill bit is drilling through the second material.

Thus, the method makes it possible to drill through a stack of different materials having different drilling requirements in a single pass and with a single drill bit which alternately satisfies the drilling requirements of the different materials.

According to one embodiment of the drilling method, an advance, i.e., the progression of the drill bit per rotation in the axial direction of the drilling, is limited by an angle formed by each cutting edge relative to the axis of the drill bit and by the offset distance D so that only one cutting edge removes matter at a given time during the drilling.

Thus, a cutting edge made for drilling one material is prevented from participating in the drilling of another material by keeping this cutting edge behind the cutting edge in the process of performing the drilling.

In one embodiment of the drilling method, the cutting parameters, for example the rotation speed and advance of the drill bit, are modified when the direction of the offset D is modified during the drilling.

This optimizes the work of each cutting edge in the material through which it drills.

In one embodiment of the drilling method, the at least one first cutting edge and second cutting edge are disposed on the drill bit so as to remove matter in opposite directions of rotation of the drill bit, and the direction of rotation is reversed during the drilling based on the cutting edge that must drill through a material of the stack.

In this case, the change in the material being drilled through in the stack is accompanied by a reversal of the direction of rotation of the drill bit, which advantageously triggers the change in the offset of the axis of the drill bit so as to change the cutting edge performing the drilling.

In one embodiment of the drilling method, the direction in which the first axis is offset by the offset distance D relative to the axis of the drill bit is determined by a measurement of the depth of the drilling in progress.

Thus, geometric measuring means, using the knowledge of the thicknesses of the materials drilled, detect a precise change in the direction of the offset of the axis.

In one embodiment of the drilling method, the direction in which the first axis is offset by the offset distance D relative to the axis of the drill bit is determined by a measurement of stress on the drill bit, for example a torque or a force absorbed by a drilling device, during the drilling.

Thus, the implementation of the method for changing the direction of the offset of the axis makes use of the properties of the drilled materials and does not require an exact knowledge of the drilled thicknesses.

BRIEF DESCRIPTION OF THE DRAWINGS

The description and the drawings of an exemplary embodiment and implementation of the invention will enable a clearer understanding of the objects and advantages of the invention. It is clear that this description is given only as a nonlimiting example.

In the drawings.

Figure 1:
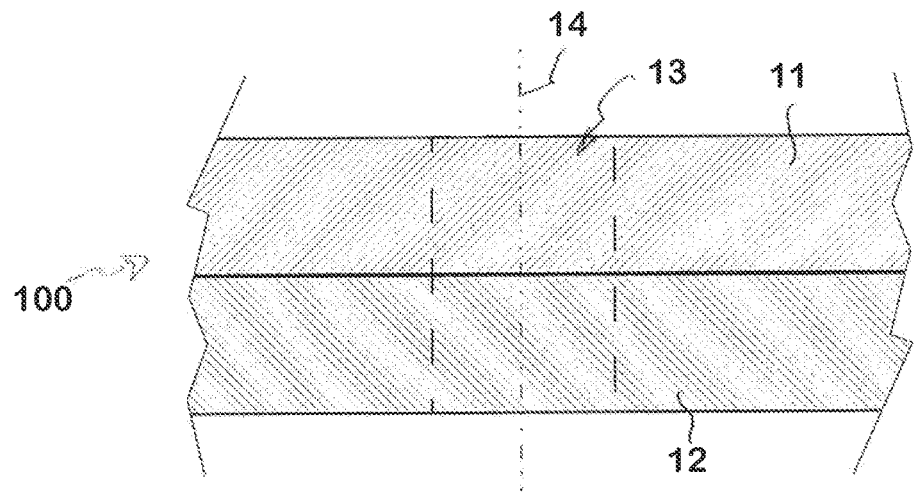
FIG. 1 schematically illustrates an assembly of two pieces composed of different materials forming a heterogeneous stack through which a hole must be drilled.
Figure 2:
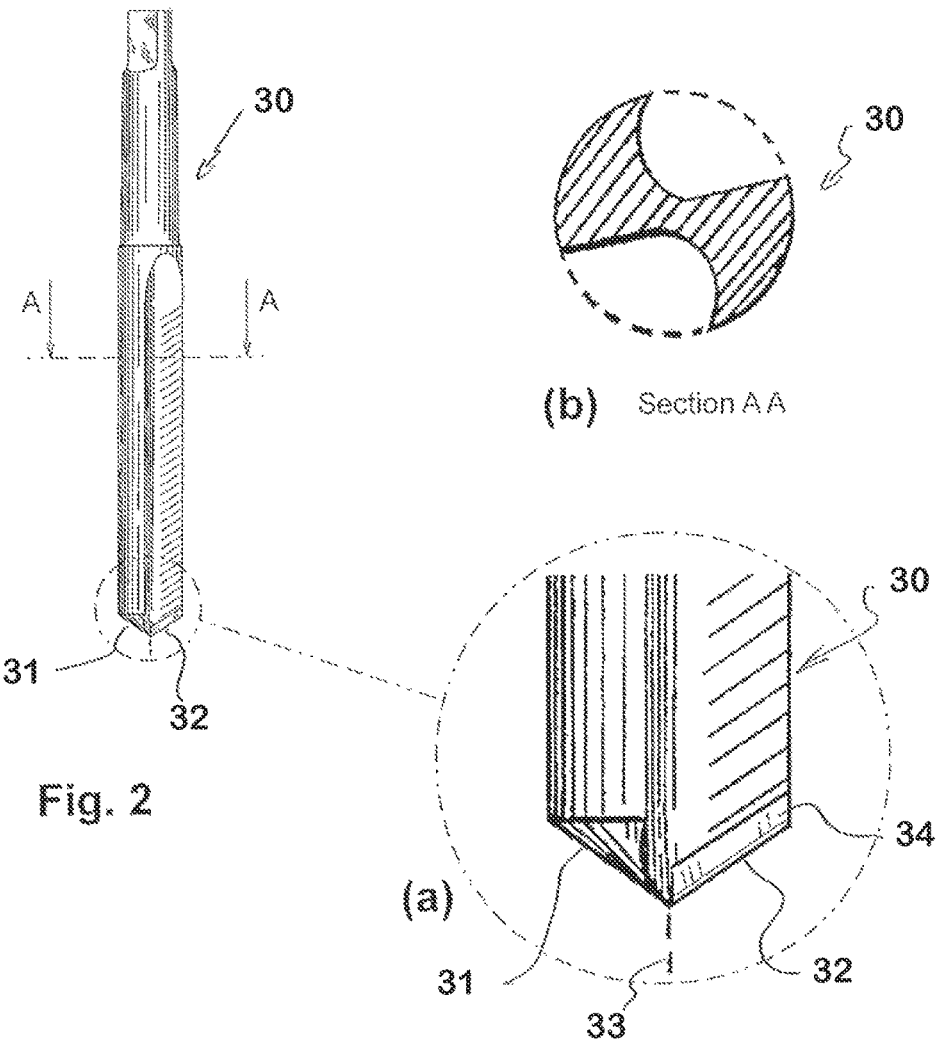
FIG. 2 represents an exemplary drill bit of the invention, with straight grooves in this example, detail (a) showing an enlargement of the end of the drill bit and the cutting edges, and detail (b) corresponding to a section of the body of the drill bit.

In the drawings, parts representing elements having the same function, though of different shapes, are identified by the same references.

The elements represented in the various figures and the various elements in a single figure are not necessarily shown to scale. In particular, the offset of the axes illustrated is greatly enlarged relative to the other elements shown, for the sake of clarity in the illustrations.

DETAILED DESCRIPTION OF THE EMBODIMENTS

FIG. 1 schematically shows, in cross-section, an assembly 100 of two pieces, a first piece 11 and a second piece 12, composed of two different materials.

In practice, in this example, the assembly may comprise more than two pieces passed through by a drill hole, on condition that all of the pieces are composed of a material having machining properties similar to one of two homogeneous families of materials in the stack formed by the assembly.

It should be understood that when two materials are considered to be different or to belong to different families, in the context of the invention, only the behavior of the materials with respect to the drilling tools used is taken into consideration.

Thus, two materials may be different with respect to their ordinary classifications but may behave similarly with respect to machine tools. For example, two steels of different grades, which are two intrinsically different materials, will be considered to be similar in the context of the invention if they are ordinarily drilled with the same tools, adapting a cutting speed if necessary.

In order to illustrate an embodiment of the invention, it will be considered that in the assembly 100 of FIG. 1, the first piece 11 is formed, in the area of the hole 13 to be produced, of a titanium alloy and that the second piece 12 is formed of carbon fiber composite material.

Throughout the description of this example, the first piece 11 will also be referred to as the titanium piece and the second piece 12 will also be referred to as the carbon piece.

Figure 5:
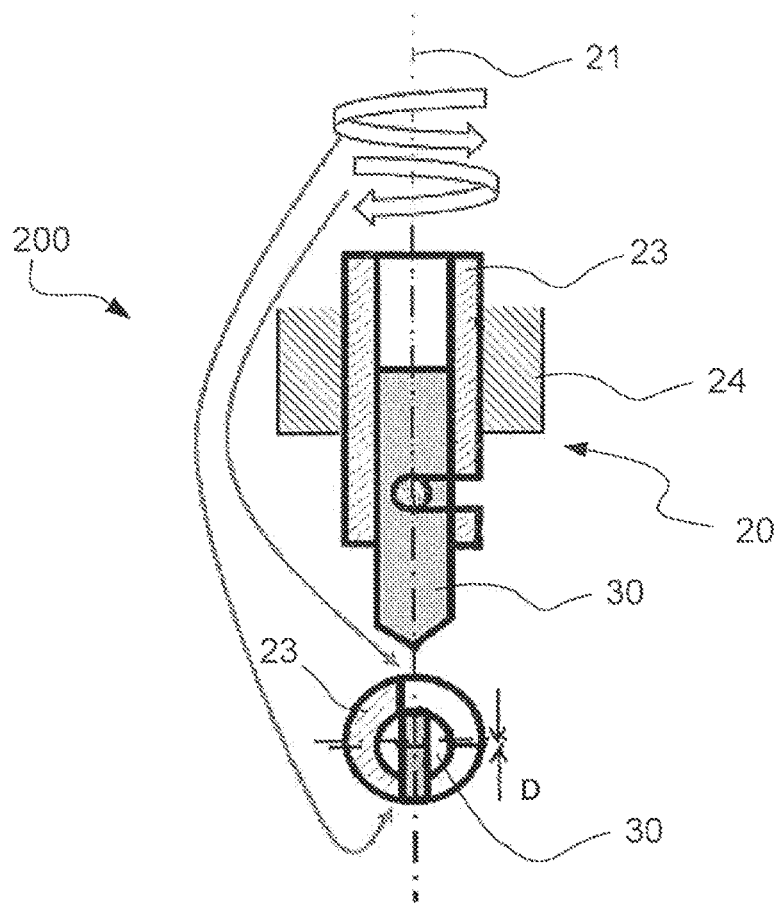
FIG. 5 illustrates, in a section along a longitudinal axial plane and along a plane perpendicular to the axis of the tool, an exemplary chuck using an eccentric sleeve in which the drill bit is mounted to change the direction of the offset of the rotational axis by rotating the sleeve inside the chuck, the rotation in the case illustrated being driven by a change in the direction of rotation of the chuck.

The drilling device 200 of the invention, as schematically represented in an exemplary embodiment in FIG. 5, comprises a chuck 20 and a drill bit 30.

The chuck 20 is a mechanical element connecting rotational drive means, not represented, for example an automatic drilling unit which provides the power required to drive the drill bit in rotation and to ensure an advance of the drill bit during drilling, with the drill bit 30 that performs the drilling of the materials.

The chuck 20 comprises a first longitudinal axis 21 around which said chuck is driven in rotation by the drive unit.

The chuck 20 comprises a second longitudinal axis 22, parallel to the first axis 21 and laterally offset relative to said first axis, coincident with an axis 33 of the drill bit 30 when the drill bit is attached to the chuck, so as to form a lateral offset D of said first axis relative to said second axis, or to said axis of the drill bit.

In addition, the chuck comprises means for creating the lateral offset D, which are modifiable so as to allow said first axis to be laterally offset to either side of said second axis, the lateral offset in this case being considered to fall within a reference frame linked to the drill bit and rotating with said drill bit.

In practice, the lateral offset D, while drilling operations are in progress, is small with respect to a diameter of the drill bit 30; in practice, the lateral offset D is preferably between 0.05 mm and 0.2 mm, for example 0.1 mm. The choice of acceptable values for this lateral offset D will also be covered in the description of the method of the invention.

The drill bit 30, in the exemplary embodiment illustrated, is a drill bit comprising two cutting edges, placed in the conventional way for a drill bit with two cutting edges, which are substantially asymmetrical relative to the axis 33 of the drill bit.

According to the invention, the two cutting edges have properties adapted to different machining characteristics.

A first cutting edge 31 is, in the exemplary embodiment, adapted to the machining of titanium alloys.

For example, the first cutting edge 31 is formed of tungsten carbide.

The second cutting edge 32 is adapted to the machining of carbon fiber composites, whose abrasive properties are well known.

For example, the second cutting edge 32 is formed by a diamond-coated tungsten carbide or by a diamond tip attached to the drill bit 30.

In one embodiment, the drill bit 30 is made conventionally of tungsten carbide so that the first cutting edge 31 is formed by the body of said drill bit and a diamond tip 34 is attached, for example soldered, to said drill bit in order to form the second cutting edge 32.

When the drill bit 30 is attached to the chuck 20, the directions in which the first axis 21 may be offset relative to the axis 33 of the drill bit, coincident with the second axis 22, substantially correspond to those determined by the first cutting edge 31 and the second cutting edge 32.

In one embodiment, the chuck 20 and the drill bit 30 comprise complementary means which cooperate to enable the relative positioning of said chuck and said drill bit in the position that makes it possible to have the directions of the offset coincide with those of the cutting edges, and also to maintain this positioning during drilling operations.

It should be understood that, in the context of the invention, the offset of the axis for a given drilling position is fixed within a reference frame linked to the drill bit 30, which is equivalent to considering that the drill bit 30 rotates around its axis 33 within a reference frame that is fixed relative to the pieces 11, 12 to be drilled, at the same rotation speed as the chuck 20 around the first axis 21.

Figure 3A:
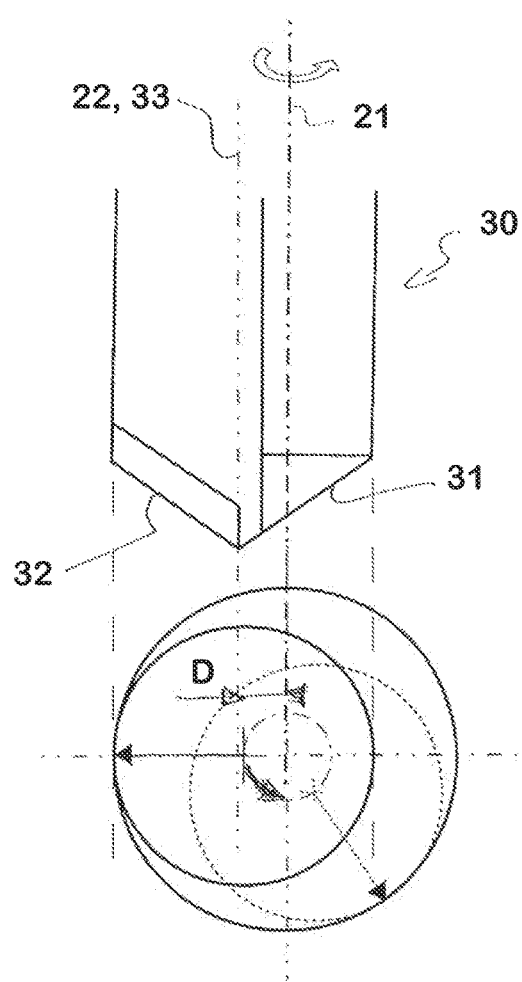
FIG. 3a schematically represents a side view of a drill bit during a drilling by a first cutting edge with an offset of the drilling axis relative to the axis of the drill bit, and a top view of the drill superimposed on an outline of the hole produced.
Figure 3B:
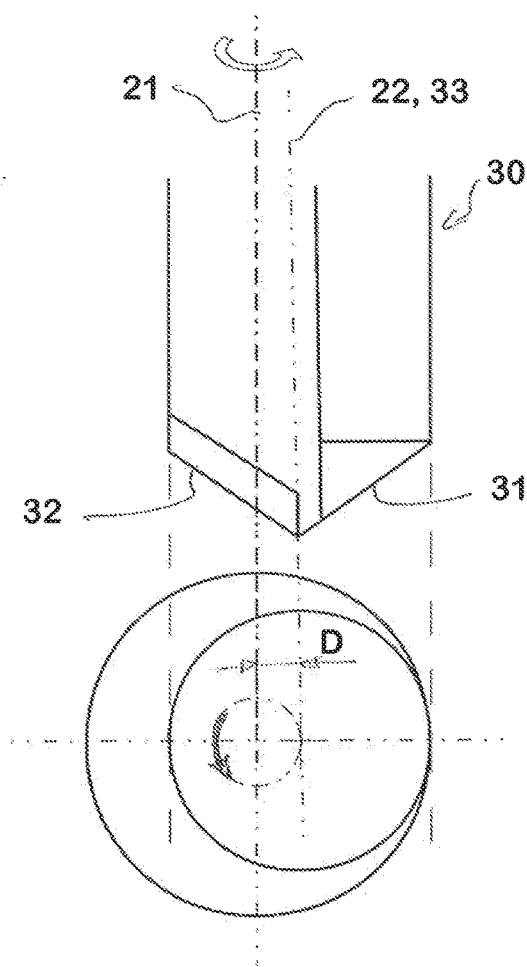
FIG. 3b schematically represents, in a manner similar to FIG. 3a. a side view of the drill bit during a drilling by a second cutting edge, and a top view of the drill bit superimposed on an outline of the hole produced, the change in cutting edge relative to FIG. 3a being the result of the change in the offset direction.

As a result of this driving in rotation of the drill bit 30, it should be noted that a diameter of the hole produced is greater than a drilling diameter of said drill bit by twice the value of the lateral offset D, as illustrated in FIGS. 3a and 3b.

Furthermore, the cutting edges 31, 32 are inclined in an axial plane of the drill bit 30 so as to form a conical shape of the end of said drill bit, as may be seen in the various figures, projecting at a half-angle at the vertex "theta" between about 60 degrees and 45 degrees.

Figure 6:
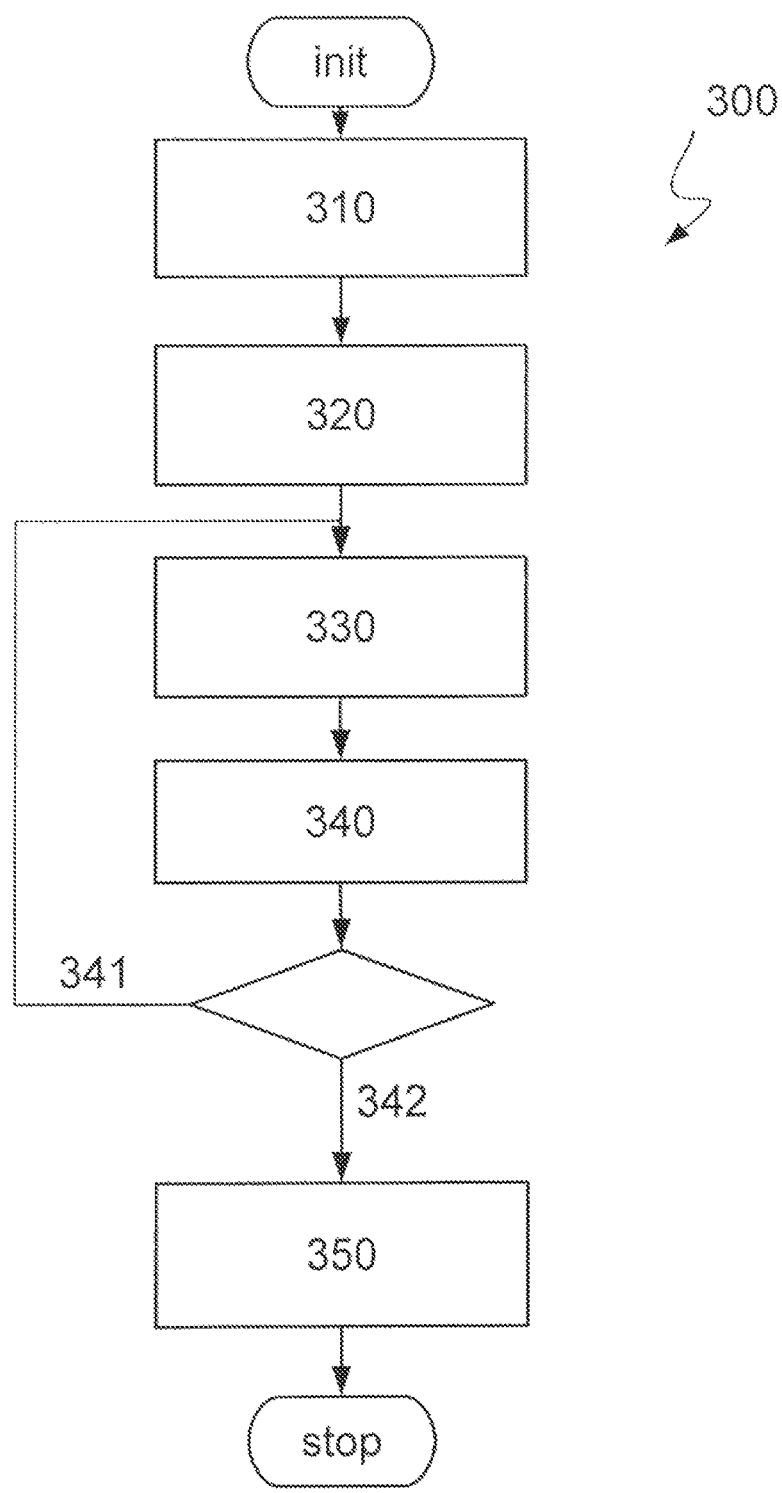
FIG. 6 shows a block diagram of the method of the invention.

To produce a hole in the assembly 100 according to a method 300 of the invention, a block diagram of which is provided in FIG. 6, in an initialization phase, the drilling device being positioned so as to place the first axis 21 of the chuck 20 coincident with an axis 14 of the hole to be produced, the drilling is begun.

In a first step 310, the axis 33 of the drill bit 30 held in the chuck 20 is placed so that the first axis 21 of rotation of said chuck is offset relative to said axis of the drill bit toward the side opposite the cutting edge corresponding to the first material to be drilled. In order to simplify the explanation, the first material constituting the first piece 13 of the assembly will be considered to be the one for which the first cutting edge 31 is suitable for drilling.

The lateral offset D of the first axis 21 relative to the axis 33 of the drill bit, as illustrated in FIG. 3a, is obtained by adjusting the chuck so that the second axis 22 of the chuck, with which the axis 33 of the drill bit is coincident, is itself offset in the relative direction and with the desired amplitude.

In a second step 320, the drilling device is engaged, using the cutting parameters, particularly the rotation speed and advance of the drill bit, defined for drilling the first piece 11 formed of the first material with the drill bit, whereof only the first cutting edge 31 engages the material, for example the titanium piece, due to the shape of the end of the drill bit and to the lateral offset of its axis 33.

Figure 4:
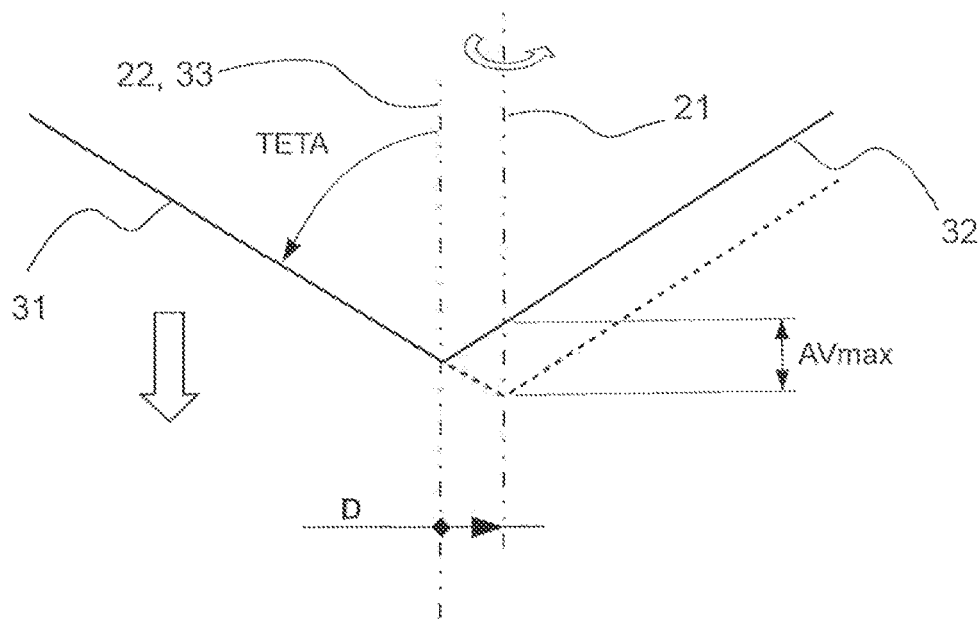
FIG. 4 schematically illustrates the end of the drill bit and the possible advance of the tool as a function of the offset of the axis of rotation.

The sole action of the first cutting edge 31, due to the lateral offset of the axis of the drill bit, results from the fact that, in a reference frame linked to the assembly 100 being drilled, said first cutting edge is virtually located, in the direction of the advance of the drill bit, in front of the second cutting edge 32 located on the opposite side of the axis of the drill bit, as illustrated in FIG. 4.

In this FIG. 4, the broken line represents the outline of the cone described by the first cutting edge 31 in rotation around the first axis 21 of the chuck.

This same FIG. 4 also shows that the second cutting edge 32 is behind the first cutting edge 31 in the direction of the advance of the drill bit, indicated in the drawing by an arrow pointing downward, and that during the rotation of the drill bit 30, said second edge is not in contact with the material of the first piece 11, the material having been removed by the passage of said first cutting edge in simultaneous rotation.

It should be noted that this configuration, which protects the second cutting edge 32 which is not adapted to the machining of the second material, is maintained as long as the advance of the drill bit is slow enough.

It is therefore necessary for the advance per rotation of the drill bit to be less than a value Avmax=2×D/tangent (theta), in which formula theta represents the half-angle at the vertex of the cone formed by the cutting edges. Accordingly, it is possible to determine the practical limits to the value of the half angle at the vertex theta, which at least at its highest value must not be too close to 90 degrees in order to maintain an advance compatible with the performance of the drilling.

It may also be said that a center area of the hole, with a diameter equal to twice the offset D, is not subjected to machining by the first cutting edge 31. Thus, theoretically, a center post is formed during the drilling. However, this center post, whose diameter is small, on the order of one tenth of a millimeter in practice, and which moreover is located in a drilling area in which the cutting speeds are near zero, does not impede the method, said post being destroyed without consequence during the advance of the second cutting edge 32.

In a third step 330, when the end of the drill bit 30 has passed through the first piece 11, the axis 33 of the drill bit 30, still maintained in the chuck 20, is displaced so that the first axis 21 of rotation of the chuck 20 is laterally offset relative to said axis of the drill bit toward the side opposite the second cutting edge 32 corresponding to the second material to be drilled, i.e., the material of the second piece 12 of the assembly, for example the carbon piece, for which the second cutting edge is suitable for drilling.

The axis 33 of the drill bit is offset, as illustrated in FIG. 3b, by adjusting the chuck so that the second axis 22 of the chuck, with which the axis of the drill bit is coincident, is itself offset in the direction and with the desired amplitude, in this example toward the second cutting edge 32.

In a fourth step 340, the drilling is continued using the cutting parameters, particularly the rotation speed and advance of the drill bit, defined for drilling the second material with the drill bit, whereof only the second cutting edge 32 engages with the material, a situation which results from the same phenomena as those explained for the drilling of the first piece, the roles of the first cutting edge and second cutting edge being reversed.

If the assembly comprises more than two pieces forming a stack of materials requiring successive changes in cutting conditions, for example more than two alternating titanium pieces and composite pieces, the third step 330 and fourth step 340 are repeated 341 until the desired drilling has been completed 342.

In a fifth step 350, once the hole has been produced, the drill bit 30 is withdrawn from the assembly 100.

It should be noted that the application of the method in the case of an assembly of two or more pieces should be considered in a broad sense to be like the case of a stack of parts made of different materials which, in certain contexts, could be considered to be part of a single piece.

For example, locally, a piece can result from a succession of layers assembled, for example by adhesive, formed of different materials.

For example, a stack of different materials can result from a metal insert, for example a titanium fitting, placed in a piece of composite material, for example a carbon piece, or even an insert of ceramic material placed in a metal piece.

It should be noted that in one embodiment, the changes in the position of the axis of the drill bit are advantageously made automatically during a drilling operation by the drilling device.

In one operating mode, the changes are made based on a measured or estimated penetration of the drill bit 30 into the assembly. For a given drill hole, the thicknesses of the pieces passed through are known, for example, transmitted by digital data from models of the assembled pieces to the drilling device, and the measurement of the penetration of the drill bit into the assembly by a position sensor, transmitted to control means of said drilling device, triggers the changes in the direction of the lateral offset between the first axis 21 and the axis 33 of the drill bit and in the cutting parameters when the measured penetration coincides with an interface between two materials with different characteristics.

In another operating mode, a machining torque measurement is performed during the drilling. When a change in material results in a measurable modification of the machining torque, the change in the measured machining torque is interpreted as a change of material during the drilling, and changes in the lateral offset between the first axis 21 and the axis 33 of the drill bit and in the machining parameters are made by the drilling device so that the drilling may continue.

According to the method of the invention and using the drilling device of the invention, it is possible to drill a hole in a single pass and with a single drill bit into an assembly formed by a stack of pieces comprising materials having very different machining constraints.

For example, a stack of pieces made of titanium alloy and pieces made of carbon composite material can be drilled with a drill bit whereof a carbide cutting edge suitable for drilling through the titanium is not subjected to the intense abrasion of the drilling through the carbon composite material, and whereof a cutting edge with a diamond tip suitable for drilling through the carbon composite is not subjected to the intense heating which it would undergo during the drilling of the titanium and which would result in a rapid deterioration of the tool by transforming the diamond into graphite.

The modification of the lateral offset between the axis of rotation 21 of the chuck 20 and the axis 33 of the drill bit can be made by any system for displacing the axis of the drill bit inside the chuck.

The displacement of the axis of the drill bit can be produced by an actuator controlled by the drilling device.

The displacement of the axis of the drill bit can also be produced by the effect of the stresses generated by the drilling.

In an embodiment illustrated in FIG. 5, the drill bit 30 is mounted in a sleeve 23 of the chuck 20 with an off-center hole, so that rotating said sleeve by a given angle inside a barrel 24 of said chuck makes it possible to modify, in a reference frame linked to the tool, the relative position of the axis 33 of the drill bit and the axis 21 of the chuck.

The rotation of the sleeve 23 can be produced, for example between fixed or movable stops of the barrel 24, by elastic means sensitive to the torque generated on the drill bit by the drilling, which torque is substantially higher during the drilling of the titanium than during the drilling of the carbon composite material. The elastic means take the form, for example, of a pre-stressed return spring, calibrated so as to be in a stressed position during the drilling of the titanium, under the effect of a relatively high drilling torque, and so as to be in a position with reduced tension during the drilling of the composite material, due to a relatively low drilling torque.

In one embodiment, the first cutting edge 31 and the second cutting edge 32 are disposed in the drill bit so as to be used alternately during a drilling with reversed directions of rotations of the drill bit.

In this case, the sleeve 23 maintaining the drill bit 30 can be mounted so as to be freely rotatable inside the barrel 24 in between two angular stops, for example separated by an angle of 180 degrees, so that the drill bit is naturally rotationally positioned at one of the angular stops or the other in the direction of rotation of the chuck 20.

According to this embodiment, the change in the working cutting edge is made by reversing the direction of rotation of the drill bit during the drilling.

It is important to note that the device, the drill bit and the method of the invention can be applied to the drilling of assemblies having a thickness comprised of more than two categories of materials, in accordance with their cutting requirements.

In this case the drill bit comprises at least one cutting edge with different characteristics suitable for the drilling of each of the materials, for example three or four cutting edges.

In this case each cutting edge determines the direction in which the offset must be produced between the first axis of the chuck, coinciding with the axis of rotation, and the axis of the tool.

In practice, the need to maintain a sufficient advance of the drill bit during the drilling leads to limiting the number of cutting edges.

Although in theory the number is not limited, a practical limit is generally considered to be between two and four cutting edges.

In one embodiment the drill bit is advantageously a bit with a straight groove, which makes it possible to obtain surface conditions of good quality on the internal wall of the hole produced.

The device, the drill bit and the method of the invention make it possible to produce quality drill holes in just one pass in assemblies comprising materials whose different machining characteristics quickly cause damage to conventional drill bits.

By performing the drilling faster and providing increased drill bit service life, it is possible to produce assemblies with significantly lower costs.

The invention claimed is:

1. A drill bit comprising at least two cutting edges forming a projecting conical end of the drill bit in rotation around a longitudinal axis of said drill bit, a first cutting edge is configured to remove material from a first part of a stack during a drilling, and a second cutting edge is configured, differently from the first cutting edge, to remove, during the drilling, material from a second part of the stack having machining characteristics different from machining characteristics of the material of the first part.

2. A drilling device comprising a driver to drive a chuck in rotation around a first axis, and the drill bit according to claim 1;
wherein the chuck maintains the axis of the drill bit on a second axis of the chuck parallel to the first axis at an offset distance D from the first axis, the drill bit being mounted to the chuck so as to be driven in rotation at a rotation speed of the chuck; and
the chuck and the drill bit comprise at least two distinct positions of the first axis relative to the axis of the drill bit for laterally offsetting the first axis relative to the axis of the drill bit in a direction opposite the first cutting edge in a first position and for laterally offsetting the first axis relative to the axis of the drill bit in a direction opposite the second cutting edge in a second position.

3. The drilling device according to claim 2, wherein the first cutting edge and the second cutting edge are inclined in the axial plane of the drill bit so that they each form, with the axis of the drill bit, an angle between about 60 degrees and 45 degrees.

4. The drilling device according to claim 2, wherein each of the first and second positions of the first axis relative to the axis of the drill bit corresponds to an offset from the first axis between 0.05 mm and 0.2 mm.

5. The drilling device according to claim 2, wherein the first cutting edge is configured to drill hard metals.

6. The drilling device according to claim 5, wherein the first cutting edge is formed of a tungsten carbide configured to drill titanium-based alloys.

7. The drilling device according to claim 2, wherein the second cutting edge is configured to drill abrasive materials.

8. The drilling device according to claim 7, wherein the second cutting edge is configured to drill carbon fiber composite materials, and is formed of a diamond comprising tungsten carbide or formed by a diamond tip attached to the drill bit.

9. The drilling device according to claim 2, wherein the drill bit comprises three or four cutting edges; and wherein the chuck and the drill bit comprise distinct positions of the first axis relative to the axis of the drill bit for laterally offsetting the first axis relative to the axis of the drill bit in each of the directions opposite the directions of each of the three or four cutting edges.

10. The drilling device according to claim 2, wherein the chuck comprises a rotating sleeve with an off-center hole, movable in rotation on the chuck around the first axis, inside which the drill bit is maintained with the axis of the drill bit on the second axis, the second axis being offset relative to the first axis so that a controlled rotation of the rotating sleeve turning inside a barrel of the chuck changes a direction, in a reference frame linked to the drill bit, in which the first axis is offset relative to the axis of the drill bit.

11. The drill bit according to claim 1, wherein the first cutting edge and the second cutting edge are inclined in an axial plane of the drill bit so that they each form, with the axis of the drill bit, an angle between about 60 degrees and 45 degrees.

12. The drill bit according to claim 1, wherein the first cutting edge is configured to remove material from a part made from hard metals.

13. The drill bit according to claim 12, wherein the first cutting edge is formed of a tungsten carbide and is configured to remove material from a part made of titanium-based alloys.

14. The drill according to claim 1, wherein the second cutting edge is configured to remove material from a part made of abrasive materials.

15. The drill bit according to claim 14, wherein the second cutting edge is configured to remove material from a part made of carbon fiber composite materials, and is formed of a diamond comprising tungsten carbide or formed by a diamond tip attached to the drill bit.

16. The drill bit according to claim 1, comprising three or four cutting edges, each cutting edge being configured differently from other cutting edges to remove material from a different part of the stack during drilling.

17. The drill bit according to claim 1, wherein said at least two cutting edges are disposed on the drill bit for the first cutting edge to remove material during drilling in in a first direction of rotation of the drill bit around the axis of the drill bit and for the second cutting edge to remove material during drilling in a second direction of rotation of the drill bit, opposite to the first direction of rotation.

18. The drill bit according to claim 1, comprising one or more straight grooves oriented along the axis of the drill bit.

19. A method for drilling through an assembly of at least two parts forming a stack of at least two materials having physical characteristics requiring different drilling conditions, using a drill bit, wherein the drill bit comprises at least a first cutting edge and a second cutting edge inclined in an axial plane of said drill bit to form a projecting conical end of the drill bit in rotation around a longitudinal axis of said drill bit, the first cutting edge is configured to remove material from a first part of a stack during a drilling, and the second cutting edge is configured, differently from the first cutting edge, to remove during the drilling, material from a second part of the stack having machining characteristics different from the machining characteristics of the material of the first part, the method comprising the steps of:
drilling the material of the first part using the first cutting edge;
drilling the material of the second part using the second cutting edge;
placing and maintaining a first rotational drive axis of the drill bit, during the drilling, in lateral offset by an offset distance D relative to the axis of the drill bit;
offsetting the first rotational drive axis by the offset distance D relative to the axis of the drill bit in a direction opposite the first cutting edge in response to the drill bit drilling through the first part; and
offsetting the first rotational drive axis by the offset distance D relative to the axis of the drill bit in a direction opposite the second cutting edge in response to the drill bit drilling through the second part.

20. The drilling method according to claim 19, further comprising the step of limiting a feed per revolution of the drill bit in an axial direction of the drilling, as a function of an angle formed by each cutting edge relative to the axis of the drill bit and of the offset distance D so that only one cutting edge removes matter at a given time during the drilling.

21. The drilling method according to claim 19, further comprising the step of modifying cutting parameters in response to a change in a direction of the offset D during the drilling, the cutting parameters comprising at least a rotation speed.

22. The drilling method according to claim 19, further comprising the step of disposing said drill bit having the first cutting edge and the second cutting edge arranged on said drill bit to remove material in opposite directions of rotation of said drill bit; and reversing a direction of rotation of the drill bit based on a cutting edge utilized to drill through a material of the stack.

23. The drilling method according to claim 19, further comprising the step of determining a direction in which the first axis is offset by the offset distance D relative to the axis of the drill bit based on a depth measurement of the drilling in progress.

24. The drilling method according to claim 19, further comprising the step of determining a direction in which the first axis is offset by the offset distance D relative to the axis of the drill bit based on a measurement of stress on the drill bit, the measurement of stress comprises at least measuring at least a torque or a force absorbed by the drill bit during the drilling.

* * * * *